US011887615B2

United States Patent

(12) United States Patent
Yao et al.

(10) Patent No.: US 11,887,615 B2
(45) Date of Patent: Jan. 30, 2024

(54) METHOD AND DEVICE FOR TRANSPARENT PROCESSING OF MUSIC

(71) Applicant: Anker Innovations Technology Co. Ltd., Changsha (CN)

(72) Inventors: Qingshan Yao, Shenzhen (CN); Yu Qin, Shenzhen (CN); Haowen Yu, Shenzhen (CN); Feng Lu, Shenzhen (CN)

(73) Assignee: Anker Innovations Technology Co., Ltd., Changsha (CN)

( * ) Notice: Subject to any disclaimer, the term of this patent is extended or adjusted under 35 U.S.C. 154(b) by 263 days.

(21) Appl. No.: 17/059,158

(22) PCT Filed: Jun. 3, 2019

(86) PCT No.: PCT/CN2019/089756

§ 371 (c)(1),
(2) Date: Nov. 25, 2020

(87) PCT Pub. No.: WO2019/233359

PCT Pub. Date: Dec. 12, 2019

(65) Prior Publication Data

US 2021/0217429 A1 Jul. 15, 2021

(30) Foreign Application Priority Data

Jun. 5, 2018 (CN) ........................ 201810583109.0

(51) Int. Cl.
*G10L 21/007* (2013.01)
*G10L 25/30* (2013.01)

(52) U.S. Cl.
CPC ............ *G10L 21/007* (2013.01); *G10L 25/30* (2013.01)

(58) Field of Classification Search
CPC ....... G10L 21/007; G10L 25/30; G10L 21/02; G10L 25/51; G10H 1/0091;
(Continued)

(56) References Cited

U.S. PATENT DOCUMENTS 9,584,946 B1 * 2/2017 Lyren .................... H04W 88/02
2007/0094583 A1 * 4/2007 Randall ................ H04N 19/154 375/E7.129
(Continued)

FOREIGN PATENT DOCUMENTS

CN 102610236 A 7/2012
CN 103222187 A 7/2013
(Continued)

OTHER PUBLICATIONS

Feb. 2, 2021 (CN) Office Action—App. 201810583109.0.
(Continued)

*Primary Examiner* — Michael N Opsasnick
(74) *Attorney, Agent, or Firm* — Banner & Witcoff, Ltd.

(57) ABSTRACT

A method and device of transparency processing of music. The method comprises: obtaining a characteristic of a music to be played; inputting the characteristic into a transparency probability neural network to obtain a transparency probability of the music to be played; determining a transparency enhancement parameter corresponding to the transparency probability, the transparency enhancement parameter is used to perform transparency adjustment on the music to be played. The present invention constructs a transparency probability neural network in advance based on deep learning and builds a mapping relationship between the transparency probability and the transparency enhancement parameters can be constructed, so that the music to be played can be automatically permeated.

18 Claims, 4 Drawing Sheets

(58) Field of Classification Search
CPC ....... G10H 2210/091; G10H 2210/281; G10H 2250/311
See application file for complete search history.

(56) References Cited

U.S. PATENT DOCUMENTS

| | | | | |
|---|---|---|---|---|
| 2009/0238371 | A1* | 9/2009 | Rumsey | H04R 29/001 381/58 |
| 2013/0297539 | A1 | 11/2013 | Piekniewski et al. | |
| 2014/0081682 | A1* | 3/2014 | Perlmuter | G06Q 10/063 705/7.11 |
| 2016/0078879 | A1* | 3/2016 | Lu | G10L 25/81 381/56 |
| 2017/0124074 | A1* | 5/2017 | Cama | G06F 16/686 |
| 2017/0140743 | A1* | 5/2017 | Gouyon | G06Q 30/0255 |

FOREIGN PATENT DOCUMENTS

| | | | |
|---|---|---|---|
| CN | 107329996 | A | 11/2017 |
| CN | 107888843 | A | 4/2018 |
| CN | 108022591 | A | 5/2018 |
| CN | 109119089 | A | 1/2019 |

OTHER PUBLICATIONS

Mar. 20, 2020 (CN) Office Action—App. 201810583109.0.
Sep. 7, 2020 (CN) Office Action—App. 201810583109.0.
Aug. 28, 2019 (WO) International Search Report—App. PCT/CN2019/089756.

* cited by examiner

METHOD AND DEVICE FOR TRANSPARENT PROCESSING OF MUSIC

CROSS REFERENCE TO RELATED APPLICATION

This application is a national stage application, filed under 35 U.S.C. § 371, of International Application No. PCT/CN2019/089756, filed on Jun. 3, 2019, which claims priority to Chinese Application No. 2018105831090, filed on Jun. 5, 2018. The entire disclosures of each of the above applications are incorporated herein by reference.

BACKGROUND OF INVENTION

Field of Invention

The present invention relates to the field of sound, and in particular, to a method and device for transparency processing of music.

Background

Sound quality is a subjective evaluation of audio quality. Sound quality is generally evaluated by dozens of indicators. For example, music transparency is an important indicator which represents reverberation and echo-like effects in music. Having right echoes will give a music a sense of space and create an aftertaste effect. For some certain types of music, such as symphonic music and nature-inspired music, where the transparency is enhanced to produce better sound effect, but not all types of music are suited to transparency enhancement. Therefore, determining which music is suitable for transparency enhancement and how to set the enhancement parameters becomes the main problem of transparency adjustment.

The current method of sound quality adjustment (such as transparency adjustment) is mainly adjusted by user himself. The user manually choose whether to reverberate the music or not, and select a set of parameters given in advance to produce a reverberation effect for specific environment, such as a small room, bathroom, and so on. These creates operational complexity for the user and affects user experience.

SUMMARY OF INVENTION

The present invention provides a method and device for automatically adjusting music transparency, which can be achieved by deep learning. The present invention could eliminate user operation, and improve user experience.

A first aspect of the present invention provides a method of transparency processing of music, comprising:

- obtaining a characteristic of a music to be played;
- inputting the characteristic into a transparency probability neural network to obtain a transparency probability of the music to be played;
- determining a transparency enhancement parameter corresponding to the transparency probability, the transparency enhancement parameter is used to perform transparency adjustment on the music to be played.

In an embodiment of the present invention, the method further comprises following step before inputting the characteristic into the transparency probability neural network:

- obtaining the transparency probability neural network by training based on a training dataset.

In an embodiment of the present invention, each training data of the training dataset is music data, and each training data has a characteristic and a transparency probability.

In an embodiment of the present invention, the characteristic of the training data are obtained by following steps:

- obtaining a time domain waveform of the training data, framing the time domain waveform,
- obtaining the characteristic of each training data by extracting characteristic on each frame.

In an embodiment of the present invention, the transparency probability of the training data is obtained by:

- processing transparency adjustment on the training data to obtain a processed training data;
- obtaining a score from each rater of a set of raters, the score indicating whether a sound quality of the processed training data is subjectively superior to the training data;
- obtaining the transparency probability of the training data based on scores from the set of raters.

In an embodiment of the present invention, the step of obtaining the transparency probability of the training data based on the scores of the set of raters comprises:

- determining an average value of the scores from the set of raters as the transparency probability of the training data.

In an embodiment of the present invention, the step of determining a transparency enhancement parameter corresponding to the transparency probability comprises:

- determining the transparency enhancement parameter corresponding to the transparency probability based on a mapping relationship between the transparency probability and the transparency enhancement parameter.

In an embodiment of the present invention, the mapping relationship is predetermined as:

- if the transparency probability is greater than a threshold, then the transparency enhancement parameter is set as p0.

In an embodiment of the present invention, the mapping relationship is predetermined by the following steps:

- performing multiple transparency adjustments on a non-transparent music with transparency probability s, the transparency parameters are: $p+\Delta p*i$, i=0, 1, 2 . . . in order;
- obtaining a plurality of subjective perceptions t(i) corresponding to the transparency adjustments, wherein t(i) is obtained based on a score obtained by comparing the sound quality of the processed music according to the transparency parameter $p+\Delta p*i$ with the sound quality of the music processed according to the transparency parameter $p+\Delta p*(i-1)$ by the set of raters;
- determining the mapping relationship based on a magnitude of t(i).

In an embodiment of the present invention, the step of determining the mapping relationship based on a magnitude of t(i) comprises:

- if $t(n+1)<t(n)$ and $t(j+1)>t(j)$, wherein j=0, 1, . . . , n−1, then the transparency enhancement parameter corresponding to the transparency probability s is determined to be $p+\Delta p*n$.

In an embodiment of the present invention, further comprises:

- performing transparency adjustment on the music to be played based on the transparency enhancement parameters;
- playing the music after the transparency adjustment.

A second aspect of the present invention provides a method of transparency processing of music, comprising:

obtaining a characteristic of a music to be played;

inputting the characteristic into a transparency enhancement neural network to obtain a transparency enhancement parameters, the transparency enhancement parameter is used to perform transparency adjustment on the music to be played.

In an embodiment of the present invention, the method further comprises following step before inputting the characteristic into the transparency probability neural network:

obtaining the transparency probability neural network by training based on a training dataset. wherein each training data in the training dataset is music data, and each training data has a characteristic and a transparency probability.

A third aspect of the present invention provides an device for transparency processing of music, wherein the device is used for implementing the method of the first aspect or the second aspect, the device comprises:

an acquisition unit used for obtaining a characteristic of a music to be played;

a transparency probability determination unit used for inputting the characteristic into a transparency probability neural network to obtain a transparency probability of the music to be played;

a transparency enhancement parameter determination unit used for determining a transparency enhancement parameter corresponding to the transparency probability, the transparency enhancement parameter is used to perform transparency adjustment on the music to be played.

A fourth aspect of the present invention provides an device for transparency processing of music, wherein the device is used for implementing the method of the first aspect or the second aspect, the device comprises:

an acquisition unit used for obtaining a characteristic of a music to be played;

a determination unit used for inputting the characteristic into a transparency enhancement neural network to obtain a transparency enhancement parameters, the transparency enhancement parameter is used to perform transparency adjustment on the music to be played.

A fifth aspect of the present invention provides a device for transparency processing of music, wherein comprises a memory, a processor and a computer program stored on the memory and running on the processor, wherein the processor implements the steps of the method of the first aspect or the second aspect when executing the computer program.

A sixth aspect of the present invention provides a computer storage medium storing a computer program, wherein the computer program is executed by a processor to implement the method of the first aspect or the second aspect.

Beneficial Effects

The present invention constructs a transparency enhancement neural network, specifically constructs a transparency probability neural network based on deep learning in advance and constructs a mapping relationship between the transparency probability and the transparency enhancement parameters, so that the music to be played can be automatically processed for transparent. The process greatly simplifies the user's operation while ensuring the sound quality of the music, thereby enhances user experience.

BRIEF DESCRIPTION OF DRAWINGS

In order to clearly illustrate the present invention, embodiments and drawings of the present invention will be briefly described in the following. It is obvious that the drawings in the following description are only examples of the present invention, and it is possible for those skilled in the art to obtain other drawings based on these drawings without inventive work.

DETAILED DESCRIPTION OF PREFERRED EMBODIMENTS

Technical solutions in embodiments of the present invention will be described in detail in the followings in conjunction with drawings. It is clear that the described embodiments are some, but not all, of the embodiments of the present invention. Based on the embodiments of the present invention, all other embodiments obtained by a person skilled in the art without creative work are within the scope of the present invention.

Deep Learning is one of machine learning methods that applies deep neural networks to learn characteristics from data with complex models. Deep learning enables intelligent organization of low-level features of data into highly abstract features. Since deep learning has strong characteristic extraction and modeling capabilities for complex data that is difficult to abstract and model manually, deep learning is an effective implementation method for tasks such as audio adaptive adjustments that are difficult to model manually.

A transparency probability neural network based on deep learning is constructed in the present embodiment. The transparency probability neural network is obtained by training based on a training dataset. The training dataset includes a large number of training data, and each training data will be described in detail below.

The training data is music data, including characteristics of that training data, which can be used as input to the neural network. The training data also includes the transparency probability of the training data, which can be used as output of the neural network.

The original music waveform of the training data is a time domain waveform, which can be framed. Characteristics of each frame can be extracted to obtain characteristics of the training data. Alternatively, as an example, the characteristics can be extracted by Short-Time Fourier Transform (STFT), and the extracted characteristics can be Mel Frequency Cepstrum Coefficient (MFCC). It should be understood that the ways the characteristics are extracted in this invention is only schematic and other features such as amplitude spectrum, logarithmic spectrum, energy spectrum, etc. can also be obtained, which will not be listed here. In this embodiment, the extracted characteristics may be represented in the form of a characteristic tensor, e.g., an N-dimensional characteristic vector; or, the extracted characteristics can also be represented in other forms, without limitation herein.

Figure 1:
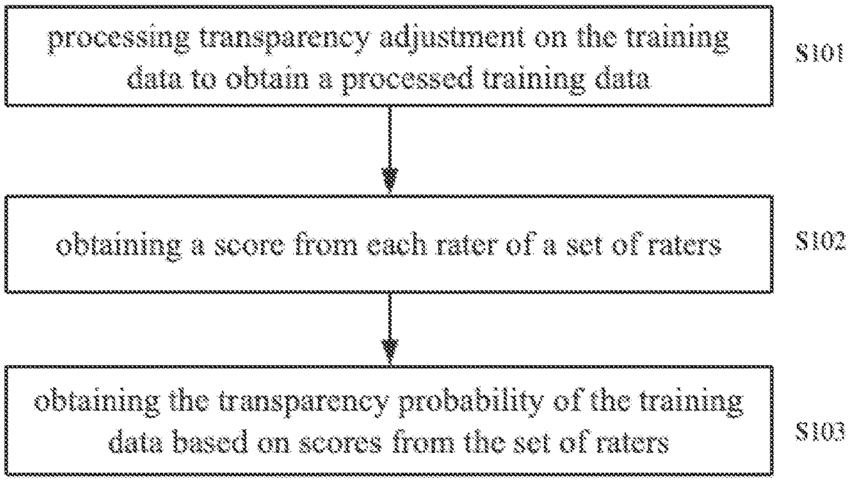
FIG. 1 is a flowchart of obtaining a transparency probability of a training data based on an embodiment of the present invention.

The transparency probability of the training data can be obtained with reference to a method shown in FIG. 1, the method comprises:

S101, processing transparency adjustment on the training data to obtain a processed training data.

For the training data, the original music waveform is a time domain waveform, which can be divided into frames and extracted characteristic from each frame to obtain frequency domain characteristics. Some of the frequency points are enhanced and some are attenuated to complete the transparency process. Afterwards, the waveform is reverted to time domain to obtain the processed training data.

Wherein, a boost multiplier at a certain frequency point f can be denoted as p(f). It is understood that a set of parameters for the transparency processing can be denoted as p, including the lift multiplier at each frequency point, and p can also be referred to as the transparency parameter or the transparency enhancement parameter, and so on.

S102, obtaining a score from each rater of a set of raters.

Not all kinds of music is suitable for transparency adjustment and the transparency effect depends on the subjective perception of users. Therefore a subjective experiment is conducted here in which rater compares the music after transparency adjustment (i.e., the processed training data obtained by S101) with the music before transparency adjustment (i.e., the training data) to determine whether sound quality of the music after transparency adjustment has become better. In other words, the score indicates whether the sound quality of the processed training data is subjectively better than that of the training data in the rater's opinion.

The rater listens to both the music after transparency adjustment (i.e., processed training data from S101) and the same music before transparency adjustment (i.e., training data), and scores the music after transparency adjustment based on whether the sound quality has gotten better or worse. For example, if a rater thinks that the sound quality of the music after transparency adjustment is better, the score is 1, otherwise it is 0. The scores of the set of raters can be obtained this way.

Figure 2:
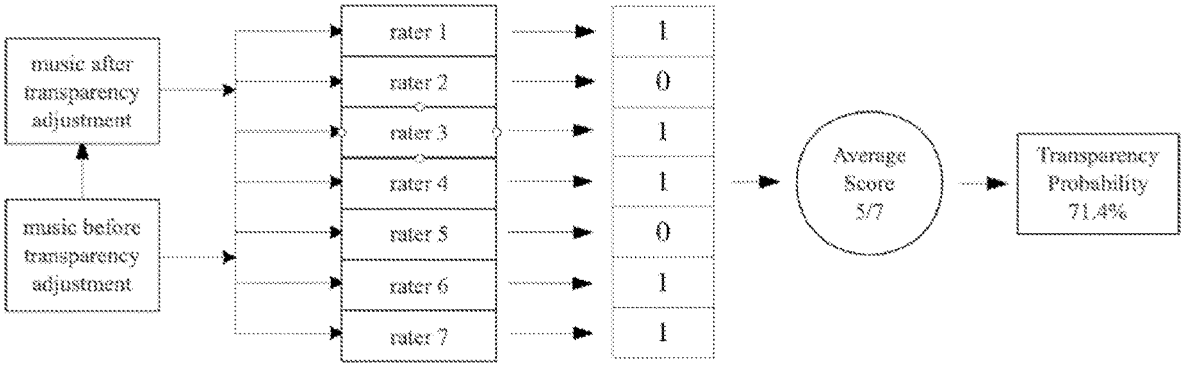
FIG. 2 is a diagram of calculating the transparency probability based on rater scores in the embodiment of the present invention.

As shown in FIG. 2, seven raters from rater 1 to rater 7 scored 1, 0, 1, 1, 0, 1, and 1 in order.

An average of all the 7 scores is used to form a rating value, which is then called "transparency probability". The higher the rating value is, the more suitable the music is for transparency processing S103, obtaining the transparency probability of the training data based on the scores of all raters.

An average of the scores of all the raters obtained by S102 can be determined as the transparency probability, which means a proportion of "1" of all the scores can be defined as the transparency probability. It is understood that the value of the transparency probability ranges from 0 to 1. In this embodiment, the average of the scores of the raters can be used as the rating value (the transparency probability), and it is understood that the higher the value is, the more suitable it is for transparency adjustment.

As shown in FIG. 2, a transparency probability of 71.4% can be obtained by calculating the average 5/7.

In this way, for each training data, the characteristics can be obtained by characteristic extraction, and the transparency probability can be obtained by referring to a similar process in FIG. 1 and FIG. 2. By taking the extracted characteristics as input and the transparency probability as output, the transparency neural network can be trained until convergence, and the trained transparency neural network can be obtained.

The embodiment also constructs a mapping relationship between the transparency probability and the transparency enhancement parameter.

In an embodiment, the mapping relationship is predetermined. For example, by denoting the transparency enhancement parameter as P and the transparency probability as s, the mapping relationship can be pre-defined as:

$$\underline{P} = \begin{cases} p0, & s > s0 \\ 0, & s \le s0 \end{cases}.$$

wherein s0 is referred to as a transparency probability threshold, which ranges between 0 and 1, e.g., s0=0.5 or 0.6, etc., and s0 can also be some other value, which is not limited by the present invention. It can be seen that if the transparency probability is greater than the threshold, the corresponding transparency enhancement parameter P=p0, wherein p0 is a set of known fixed parameters, which represents the enhancement multiplier at at least one frequency point. The enhancement multipliers at different frequency points can be equal or unequal, which is not limited by the present invention. If the transparency probability is less than or equal to the threshold, the corresponding transparency enhancement parameter p=0, i.e., which indicates no transparency adjustment will be processed.

In another embodiment, the mapping relationship can be determined by subjective experiments with Just Noticeable Difference (JND).

The process of determining the mapping relationship includes: performing multiple transparency adjustments on a nontransparent music with transparency probability s, the transparency parameters are: p+Δp*i, i=0, 1, 2 . . . in order; obtaining a plurality of subjective perceptions t(i) corresponding to the transparency adjustments, wherein t(i) is obtained based on a score obtained by comparing the sound quality of the processed music according to the transparency parameter p+Δp*i with the sound quality of the music processed according to the transparency parameter p+Δp*(i−1) by the set of raters; determining the mapping relationship based on a magnitude of t(i).

Figure 3:
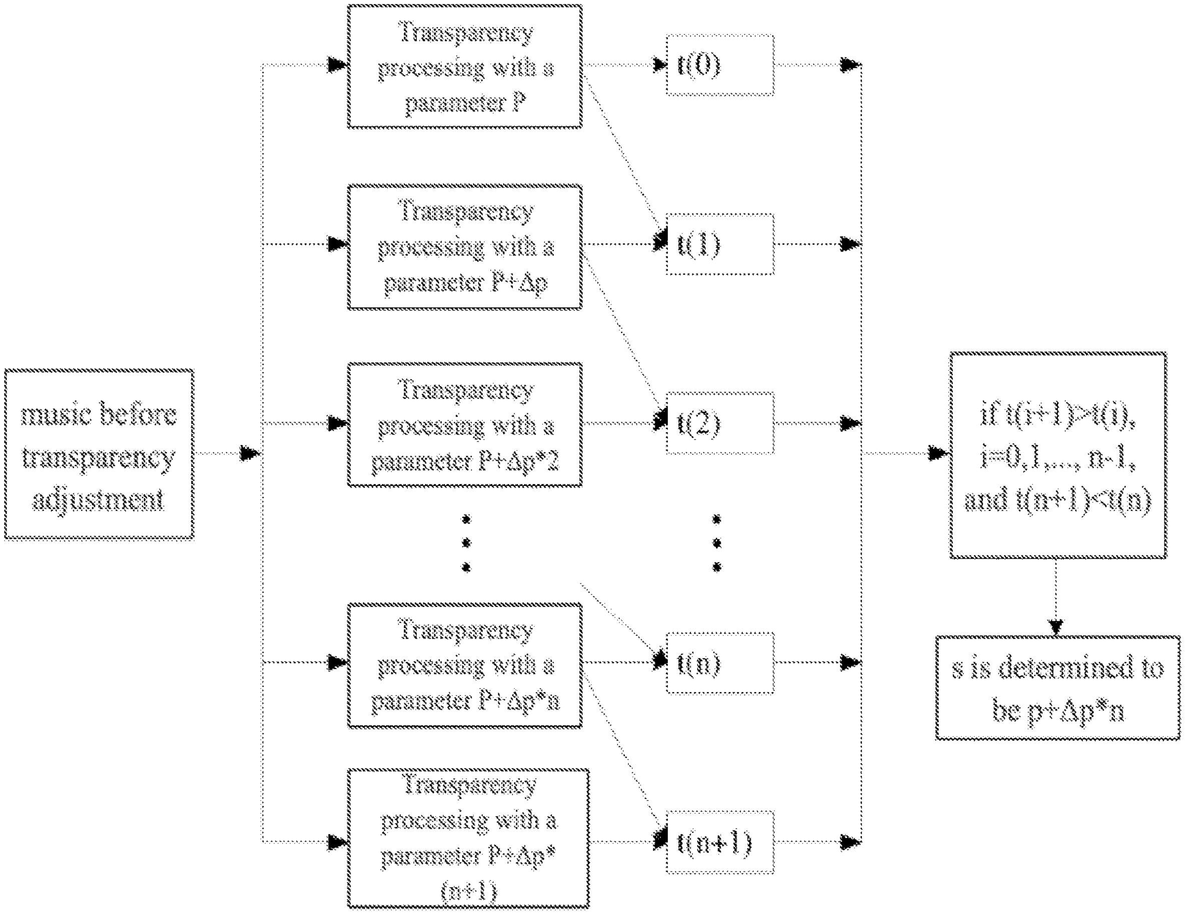
FIG. 3 is a diagram of determining a mapping relationship in the embodiment of the present invention.

This procedure can be implemented with reference to FIG. 3, where multiple transparency adjustments are applied to a nontransparent music, with the transparency parameters being p, p+Δp, p+Δp*2, . . . , p+Δp*n, p+Δp*(n+1). Subsequently, corresponding subjective perceptions are obtained by comparing the sound quality of two adjacent transparency adjustments of the music.

As in FIG. 3, t(0) is obtained by comparing the sound quality of the music processed according to the transparency parameter p with the sound quality of the nontransparent music, and t(i) is obtained by comparing the sound quality of the music processed according to the transparency parameter p+Δp*i with the sound quality of the music processed according to the transparency parameter p+Δp*(i−1). In the following, music processed according to the transparency parameter $p+\Delta p*i$ is denoted as YY(i) for the convenience of description. Specifically, multiple raters listen to the non-transparent music as well as YY(0) and score it, and t(0) is calculated as the average of the scores. YY(i) and YY(i−1) are listened to and scored by multiple raters, and t(i) is calculated by averaging the scores. If the sound quality of YY(i) is better than the sound quality of YY(i−1), the score is 1, otherwise the score is 0.

Further, the mapping relationship can be determined based on the magnitude relationship of t(i). If $t(n+1)<t(n)$ and $t(j+1)>t(j)$, $j=0, 1, \ldots, n-1$, then the transparency enhancement parameter $P=p\Delta p*n$ corresponding to the transparency probability s in this mapping relationship can be determined.

For a large number of nontransparent music, the correspondence is obtained according to a process shown in FIG. 3, which allows the mapping between the transparency probability and the transparency enhancement parameters to be established.

Wherein, different correspondences could be obtained for different nontransparent music having equal transparency probability, in this case, the different transparency enhancement parameters can be averaged. For example, music 1 and music 2 both have a transparency probability of s1. By the procedure shown in FIG. 3, a corresponding transparency enhancement parameter $P=p+\Delta p*n1$ for music 1 is obtained according to s1. By the procedure shown in FIG. 3, a corresponding transparency enhancement parameter $P=p+\Delta p*n2$ for music 2 is obtained according to s1. When establishing the mapping relationship, the transparency probability of s1 in this mapping relationship can be determined corresponds to $p+\Delta p*(n1+n2)/2$.

Comparing the above two different embodiments, it can be understood that determining mapping relationship through JND subjective experiments is labor intensive and consumes much more time, however, this implementation fully this implementation takes full account of human subjectivity, and the obtained mapping relationship are more close to user's real auditory experience. In practical applications, the above-mentioned implementation can be considered in combination with various factors, such as accuracy, labor cost, and so on.

It should be noted that the term "average" is used herein to mean a resulting value obtained by averaging multiple terms (or values). For example, the average in the above embodiments can be an arithmetic average. However, it is understood that the "average" may also be calculated in other ways to obtain, such as a weighted average, where the weights of the different terms may be equal or unequal, and the present embodiment does not limit the manner of averaging.

Based on the above description, the present embodiment constructs a transparency probability neural network and a mapping relationship between the transparency probability and the transparency enhancement parameters. The present embodiment also provides a transparency enhancement neural network, the input of the network is a characteristic of the music data and the output of which is a transparency enhancement parameter, specifically, is a transparency enhancement parameter for which the transparency enhancement neural network is recommended to perform transparency adjustment on the music data. The transparency augmentation neural network is obtained by training based on a training data set. Each training data in the training dataset is music data, and each training data has a characteristic and a recommended transparency enhancement parameter. For each training data, its characteristics can be obtained by characteristic extraction. For each training data, the transparency enhancement parameters can be obtained with reference to the relevant descriptions in the aforementioned FIGS. 1 to 3. Thus, the characteristics of the training data can be used as input, and the transparency enhancement parameters of the training data can be used as output, and the trained transparency enhancement neural network can be trained until convergence is obtained.

In other embodiments, it can be considered that the transparency enhanced neural network has an intermediate parameter: a transparency probability. That is, the transparency enhanced neural network can obtain a transparency probability based on the characteristics of the input music data, and then obtain a transparency enhancement parameter as an output of the transparency enhanced neural network based on the transparency probability. This process can be understood with the reference to the aforementioned transparency probability neural network and the mapping relationship between the transparency probability and the transparency enhancement parameters, and will not be repeated herein.

Figure 4:
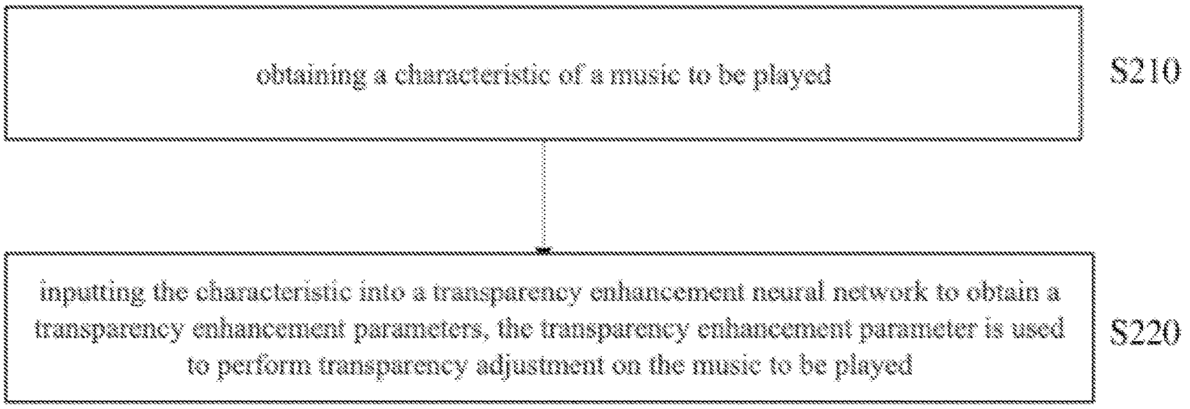
FIG. 4 is a flowchart of a method of transparency processing of music in an embodiment of the present invention.

An embodiment of the present invention provides a method of transparency processing of music, FIG. 4 shows a flowchart of the method, which comprise:

S210, obtaining a characteristic of a music to be played.

S220, inputting the characteristic into a transparency enhancement neural network to obtain a transparency enhancement parameters, the transparency enhancement parameter is used to perform transparency adjustment on the music to be played.

The transparency enhancement neural network has an intermediate variable which could be a transparency probability. For example, the transparency probability neural network can be obtained based on the aforementioned transparency probability, and the transparency enhancement parameters can be obtained based on the transparency probability.

Prior to S220, the method further comprises: obtaining the transparency probability neural network by training based on a training dataset. wherein each training data in the training dataset is music data, and each training data has a characteristic and a transparency probability.

The characteristics of the training data may be obtained by: obtaining a time domain waveform of the training data; framing the time domain waveform; obtaining the characteristic of each training data by extracting characteristic on each frame.

Wherein the transparency enhancement parameters of the training data can be obtained by: processing transparency adjustment on the training data to obtain a processed training data; obtaining a score from each rater of a set of raters, the score indicating whether a sound quality of the processed training data is subjectively superior to the training data; obtaining the transparency probability of the training data based on scores from the set of raters; determining an average value of the scores from the set of raters as the transparency probability of the training data; determining the transparency enhancement parameter corresponding to the transparency probability based on a mapping relationship between the transparency probability and the transparency enhancement parameter.

The mapping relationship is predetermined as: if the transparency probability is greater than a threshold, then the transparency enhancement parameter is set as p0.

The mapping relationship is predetermined by the following steps: performing multiple transparency adjustments on a nontransparent music with transparency probability s, the transparency parameters are: p+Δp*i, i=0, 1, 2 . . . in order; obtaining a plurality of subjective perceptions t(i) corresponding to the transparency adjustments, wherein t(i) is obtained based on a score obtained by comparing the sound quality of the processed music according to the transparency parameter p+Δp*i with the sound quality of the music processed according to the transparency parameter p+Δp*(i−1) by the set of raters; determining the mapping relationship based on a magnitude of t(i).

In an embodiment, the transparency enhancement neural network comprises a transparency probability neural network and a mapping relationship between the transparency probability and the transparency enhancement parameters, and accordingly, S220 may comprise: inputting the characteristics to the transparency probability neural network, obtaining the transparency probability of the music to be played, and based on the mapping relationship between the transparency probability and the transparency enhancement parameters, and the transparency enhancement parameter corresponding to the transparency probability is obtained based on the mapping between the transparency probability and the transparency enhancement parameter.

Figure 5:
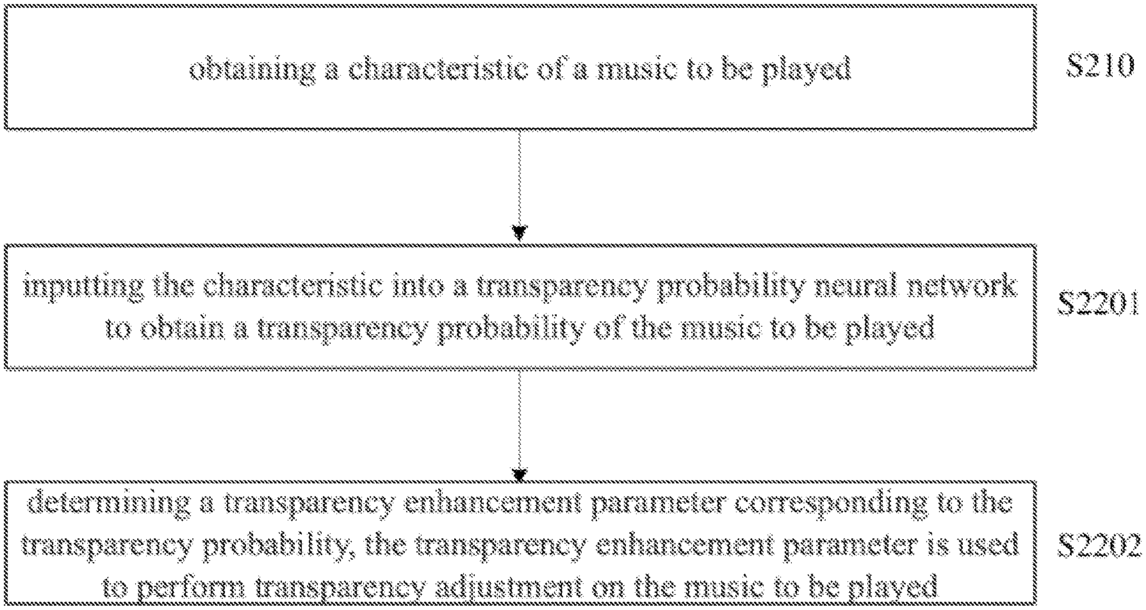
FIG. 5 is another flowchart of the method of music transarency adjustment in an embodiment of the present invention.

A flowchart of another method of transparency processing of music provided by the present embodiment is shown in FIG. 5, comprises:

S210, obtaining a characteristic of a music to be played;

S2201, inputting the characteristic into a transparency probability neural network to obtain a transparency probability of the music to be played;

S2202, determining a transparency enhancement parameter corresponding to the transparency probability, the transparency enhancement parameter is used to perform transparency adjustment on the music to be played.

The transparency probability neural network in S2201 can be a well-trained transparency probability neural network as described above, and it is understood that the aforementioned training process is generally executed on a server (i.e., in the cloud).

The S210 includes obtaining the characteristics of the music to be played by characteristic extraction. Alternatively, S210 may comprise receiving the characteristics of the music to be played from a corresponding end. Wherein, if the process of FIG. 4 or FIG. 5 is performed on the server, then the corresponding end would be a user, and if the process of FIG. 4 or FIG. 5 is performed by the user, the corresponding end would be the server.

That is, the processes shown in FIG. 4 or FIG. 5 can be executed on the server side (i.e., the cloud) or on the user side (e.g., the application), and each of these scenarios will be described below in conjunction with FIG. 5.

Server-side implementation.

As an example, the music to be played is a local music of the users client.

S210 could comprise: receiving the music to be played from the client, acquiring a time domain waveform of the music to be played, dividing the time domain waveform and performing characteristic extraction on each frame to obtain its characteristics.

Alternatively, S210 could comprise: receiving music information of the music to be played from the client, where the music information includes at least one of a song title, an artist, an album, and the like. Obtaining the music to be played from the music database on the server side based on the music information, obtaining characteristics of the music to be played by dividing the time domain waveform of the music to be played and performing characteristic extraction on each frame.

Alternatively, S210 may comprise: receiving characteristics of the music to be played from the client. For example, the client may frame the time-domain waveform of the music to be played and perform characteristic extraction on each frame to obtain its characteristics, after which the client sends the obtained characteristics to the server side.

The characteristics in S210 are obtained by characteristic extraction, wherein the process of characteristic extraction can be performed on the server side or on the client side.

In S2202, a transparency enhancement parameter corresponding to the transparency probability of S2201 can be obtained based on the aforementioned mapping relationship.

Further, it can be understood that after S2202, the server side sends the transparency enhancement parameter to the client so that the client performs transparency processing of its local music to be played based on the transparency enhancement parameter. This allows local playback of the transparency processed music at the client.

As another example, the user plays the music to be played online, i.e. the music to be played is stored on the server side, for example, it is stored in a music database on the server side.

The S210 could comprise: receiving music information of the music to be played from the client, where the music information includes at least one of a song title, an artist, an album, and the like. Obtaining the music to be played from a music database on the server side based on the music information, and obtaining the characteristics of the music to be played by dividing the time domain waveform of the music to be played and extracting the characteristics for each frame.

S2202, can be based on the aforementioned mapping to obtain a transparency enhancement parameter corresponding to the transparency probability of S2201.

Further, it can be understood that after step S2202, the server could perform a transparency processing of the music to be played based on this transparency enhancement parameter. The music to be played can then be played online after the transparency processing.

Client Implementation.

The client could be a mobile device such as a smartphone, tablet, or wearable device.

S210 comprises: if the music to be played is local music, the client frame the time domain waveform of the music to be played, and perform characteristic extraction on each frame to obtain its characteristics. If the music to be played is stored on the server side, the client sends the music information of the music to be played to the server side. The music information includes at least one of a song title, an artist, an album, etc. Then the client receive the music to be played from the server side, after which the client frame the time domain waveform of the music to be played and extract the characteristics of the music for each frame. Alternatively, if the music to be played is music stored on the server side, the client sends the music information of the music to be played to the server side and subsequently receive the characteristics of the music to be played from the server side. The server obtains the music to be played from the music database based on the music information, frames the time domain waveform of the music to be played and perform characteristic extraction of each frame to obtain its characteristics. Then the server side sends the obtained characteristics to the client. It can be seen that the characteristics in S210 are obtained by characteristic extraction, wherein the process of characteristic extraction can be performed at the server side or the client side.

It should be appreciated that the music information described in this embodiment is merely exemplary and could include other information, such as duration, format, etc., which will not be enumerated here.

Prior to the process shown in FIG. 5, the client can obtain a trained transparency probability neural network from the server side, so that in S2201, the client can use the trained transparency probability neural network stored locally to obtain the transparency probability of the music to be played.

Similarly, as an example, the aforementioned mapping relationship can be determined on the server side, and the client could obtain the mapping relationship from the server side prior to the process shown in FIG. 5. In another example, the aforementioned mapping relationship can be stored directly pre-determined in the client, as implementation of the predefined mapping relationship as described above. In S2202, the client could, based on the mapping relationship, obtain a transparency enhancement parameter corresponding to the transparency probability of S2201.

Further, it can be understood that after step S2202, the client performs a transparency processing of its local music to be played based on the transparency enhancement parameter. This step allows local playback of the transparency processed music at the client.

Thus, embodiments of the present invention can pre-build a transparency probability neural network based on deep learning, so that the transparency processing of the music to be played can be performed automatically. The process greatly simplifies the user's operation while ensuring the sound quality of the music, thereby enhancing user experience.

Figure 6:
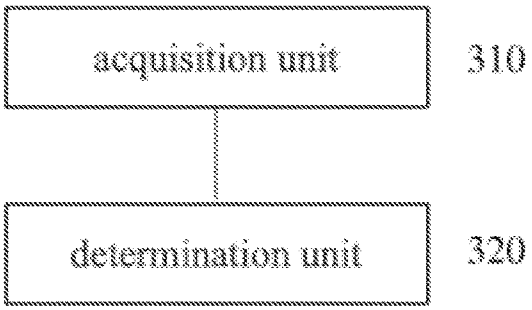
FIG. 6 is a block diagram of a device for transparency processing of music in an embodiment of the present invention.

FIG. 6 is a block diagram of a device for performing transparency processing of music of an embodiment of the present invention. The device 30 shown in FIG. 6 includes an acquisition module 310 and a determination module 320.

Acquisition module 310 is used to acquire the characteristics of the music to be played.

The determination module 320 is used to input the characteristics into a transparency enhancement neural network to obtain transparency enhancement parameters, the transparency enhancement parameters are used to perform transparency processing of the music to be played.

In an embodiment, a device 30 shown in FIG. 6 could be the server (i.e., cloud). Alternatively, the device 30 includes a training module for obtaining the transparency enhancement neural network by training based on a training dataset. Wherein, each training data in the training dataset is music data, and each training data has characteristics and recommended transparency enhancement parameters.

The transparency enhancement neural network has an intermediate variable as the transparency probability.

Figure 7:
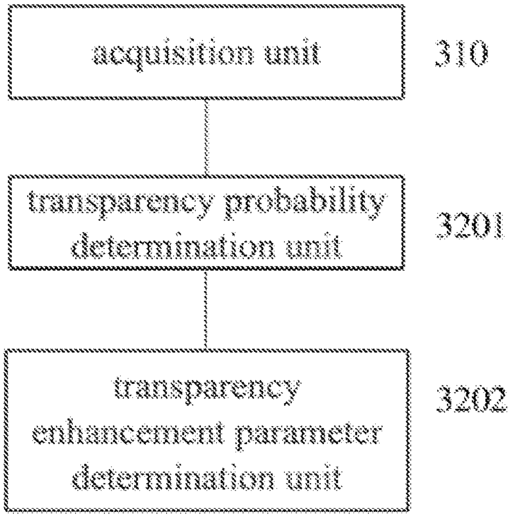
FIG. 7 is another block diagram of the device for transparency processing of music in an embodiment of the present invention.

FIG. 7 is another block diagram of a device for transparency processing of music of the present embodiment. The device 30 shown in FIG. 7 includes an acquisition module 310, a transparency probability determination module 3201, and a transparency enhancement parameter determination module 3202.

The acquisition module 310 is used for obtaining a characteristic of a music to be played.

The transparency probability determination module 3201 is used for inputting the characteristic into a transparency probability neural network to obtain a transparency probability of the music to be played.

The transparency enhancement parameter determination module 3202 is used for determining a transparency enhancement parameter corresponding to the transparency probability, the transparency enhancement parameter is used to perform transparency adjustment on the music to be played.

The device 30 shown in FIG. 7 is a server (i.e., cloud). The device 30 also includes a training module for obtaining the transparency probability neural network by training based on the training dataset.

In an embodiment, each training data in the training dataset is music data, and each training data has characteristics as well as transparency probabilities.

The characteristics of the training data can be obtained by: obtaining a time domain waveform of the training data; framing the time domain waveform; and obtaining the characteristic of each training data by extracting characteristic on each frame.

The transparency probability of the training data can be obtained by: processing transparency adjustment on the training data to obtain a processed training data; obtaining a score from each rater of a set of raters, the score indicating whether a sound quality of the processed training data is subjectively superior to the training data; obtaining the transparency probability of the training data based on scores from the set of raters. For example, determining an average value of the scores from the set of raters as the transparency probability of the training data.

The way to obtain a transparency probability neural network by training is described referring to the description of embodiments corresponding to FIGS. 1 and 2, and will not be repeated herein to avoid repetition.

In an embodiment, the transparency enhancement parameter determination module 3202 is used to determine the transparency enhancement parameter corresponding to the transparency probability based on a mapping relationship between a pre-constructed transparency probability and a transparency enhancement parameter.

In an embodiment, the mapping relationship is predetermined as: if the transparency probability is greater than a threshold, then the transparency enhancement parameter is set as p0.

In another embodiment, the mapping relationship is predetermined by the following steps: performing multiple transparency adjustments on a nontransparent music with transparency probability s, the transparency parameters are: $p+\Delta p*i$, i=0, 1, 2 . . . in order; obtaining a plurality of subjective perceptions t(i) corresponding to the transparency adjustments, wherein t(i) is obtained based on a score obtained by comparing the sound quality of the processed music according to the transparency parameter $p+\Delta p*i$ with the sound quality of the music processed according to the transparency parameter $p+\Delta p*(i-1)$ by the set of raters; determining the mapping relationship based on a magnitude of t(i). For example, if $t(n+1)<t(n)$ and $t(j+1)>t(j)$, wherein j=0, 1, . . . , n−1, then the transparency enhancement parameter corresponding to the transparency probability s is determined to be $p+\Delta p*n$. This process is described in the foregoing embodiments referring to FIG. 3, and is not repeated here to avoid repetition.

In an embodiment, the device 30 shown in FIG. 6 or FIG. 7 can be a server (i.e., cloud). The device 30 also includes a sending unit used for sending a transparency enhancement parameter to the client. The client then perform transparency processing of the music to be played based on the transparency enhancement parameters, and playing the transparency processed music.

In an embodiment, the device 30 shown in FIG. 6 or FIG. 7 can be a client. The device 30 also includes a transparency processing unit and a playback unit. The transparency processing unit is used to perform transparency processing of the music to be played based on the transparency enhancement parameters, and the playback unit is used to play the transparency processed music.

The device 30 shown in FIG. 6 or FIG. 7 can be used to implement the aforementioned method of transparency processing of music as shown in FIG. 4 or FIG. 5. To avoid repetition, it will not be repeated here.

Figure 8:
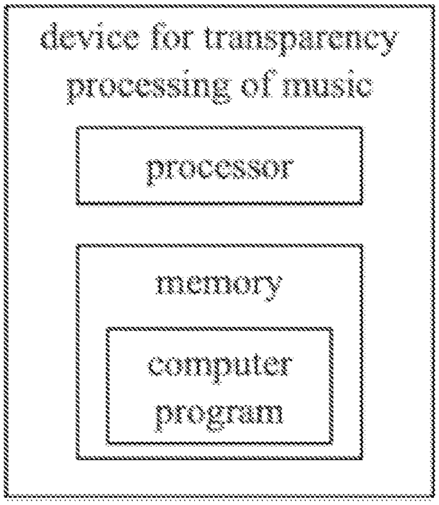
FIG. 8 is a third block diagram of the device for transparency processing of music in an embodiment of the present invention.

As shown in FIG. 8, the present embodiment also provides another device for transparency processing of music, comprising a memory, a processor, and a computer program stored on the memory and running on the processor. When the processor executes the program, the steps of the method shown in FIG. 4 or FIG. 5 are implemented.

The processor can obtain characteristics of the music to be played, and input the characteristic into the transparency enhancement neural network to obtain the transparency enhancement parameters, the transparency enhancement parameter is used to perform transparency adjustment on the music to be played. In an embodiment, the processor can obtain the characteristic of the music to be played; input the characteristic into the transparency probability neural network to obtain the transparency probability of the music to be played; and determine the transparency enhancement parameter corresponding to the transparency probability, the transparency enhancement parameter is used to perform transparency adjustment on the music to be played.

In an embodiment, the device for transparency processing of music in the present embodiment comprises: one or more processors, one or more memories, input devices, and output devices, these components of the device are interconnected via a bus system and/or other forms of connection mechanisms. It should be noted that the device can also have other components and structures as required.

The processor can be a central processing unit (CPU) or other form of processing unit with data processing capability and/or instruction execution capability, and can control other components in the device to perform desired functions.

The memory could comprise one or more computer program products, which comprise various forms of computer-readable storage media, such as volatile memory and/or non-volatile memory. The volatile memory includes, for example, random access memory (RAM) and/or cache memory (cache). The non-volatile memory includes, for example, a read-only memory (ROM), a hard disk, a flash memory, and the like. One or more computer program instructions can be stored on the computer-readable storage medium, and the processor can run the program instructions to implement the client functionality (as implemented by the processor) and/or other desired functionality of the embodiments described below. Various applications and various data, such as various data used and/or generated by the applications, etc., can also be stored on the computer-readable storage medium.

The input device can be a device used by a user to enter instructions, and includes one or more of a keyboard, a mouse, a microphone, and a touch screen.

The output device can output various information (e.g., images or sound) to an external source (e.g., a user), and includes one or more of a display, a speaker, etc.

In addition, the present embodiment provides a computer storage medium on which a computer program is stored. When the computer program is executed by the processor, the steps of the method shown in the preceding FIG. 4 or FIG. 5 can be implemented. For example, the computer storage medium is a computer readable storage medium.

The present invention constructs a transparency enhancement neural network, specifically constructs a transparency probability neural network based on deep learning in advance and constructs a mapping relationship between the transparency probability and the transparency enhancement parameters, so that the music to be played can be automatically processed for transparent. The process greatly simplifies the user's operation while ensuring the sound quality of the music, thereby enhances user experience.

A person having ordinary skill in the art may realize that the unit and algorithmic steps described in each embodiment herein can be implemented in electronic hardware, or a combination of computer software and electronic hardware. Whether these functions are performed in hardware or software depends on the particular application and design constraints of the technical solution. A person having ordinary skill in the art can use different methods to implement the described functions for each particular application, but such implementation should not be considered beyond the scope of the present invention.

It will be clear to those skilled in the art of the subject matter that for convenience and simplicity of description, the specific processes of operation of the above-described systems, devices and units can be referred to the corresponding processes in the preceding method embodiments, and will not be repeated herein.

In several of the embodiments provided in this application, it should be understood that the disclosed systems, devices and methods can be implemented in other ways. For example, the above-described device embodiments are merely illustrative, e.g., the division of the units, which is only a logical functional division, and can be practically implemented in another way. For example, multiple units or components can be combined or be integrated into another system, or some features can be ignored, or not performed. Alternatively, the coupling or communication connections shown or discussed with each other can be indirect coupling or communication connections through some interface, device, or unit, and can be electrical, mechanical, or other forms.

The units illustrated as separate parts may or may not be physically separated, and the parts shown as units may or may not be physical units, i.e., may be located in one place, or may also be distributed to a plurality of network units. Some or all of the units may be selected according to the actual need to achieve the purpose of the example scheme.

In addition, each functional unit in various embodiments of the present invention may be integrated in a processing unit, or each unit may be physically present separately, or two or more units may be integrated in a single unit.

The functions described can be stored in a computer readable storage medium if implemented in the form of a software functional unit and sold or used as a stand-alone product. Based on this understanding, the technical solution of the invention, in essence, or the part that contributes to the prior art, or the part of the technical solution, can be embodied in the form of a software product. The computer software product is stored in a storage medium and includes instructions to cause a computer device (which may be a personal computer, server, or network device, etc.) to perform all or some of the steps of various embodiments of the present invention. Whereas the aforementioned storage media include: a USB flash drive, a portable hard disk, Read-Only Memory (ROM), Random Access Memory (RAM), a disk or CD-ROM, and various other media that can store program code.

The above description is only specific embodiments of the present invention, the scope of the present invention is not limited thereto, and any person skilled in the art can readily conceive of variations or substitutions within the scope of the present invention shall be covered by the present invention. Accordingly, the scope of the present invention shall be defined by the claims.

What is claimed is:

1. A method comprising:

determining, based on a time domain waveform of a piece of music to be played, a characteristic of the piece of music to be played;

inputting the characteristic into a transparency probability neural network to obtain a transparency probability of the piece of music to be played;

determining a mapping relationship between the transparency probability and a transparency enhancement parameter by:

performing a plurality of transparency adjustments on a nontransparent piece of music with a transparency probability, wherein transparency enhancement parameters corresponding to the plurality of transparency adjustments are: $p+\Delta p*i, i=0,1,2 \ldots$ in order;

determining a plurality of subjective perceptions t(i) corresponding to the transparency adjustments based on scores that are determined by comparing a sound quality of a piece of music adjusted according to the transparency enhancement parameter $p+\Delta p*i$ with a sound quality of a piece of music adjusted according to the transparency enhancement parameter $p+\Delta p*(i-1)$ by a set of raters; and determining the mapping relationship based on a magnitude of t(i);

determining, by a computing device, the transparency enhancement parameter based on the mapping relationship between the transparency probability and the transparency enhancement parameter; and performing, based on the transparency enhancement parameter, transparency adjustment on the piece of music to be played.

2. The method according to claim 1, wherein the mapping relationship indicates that based on a determination that the transparency probability is greater than a threshold, the transparency enhancement parameter is set to be p0.

3. The method according to claim 1, wherein the determining the mapping relationship based on the magnitude of t(i) comprises:

based on a determination that $t(n+1)<t(n)$ and $t(j+1)>t(j)$, wherein $j=0, 1, \ldots, n-1$, determining the transparency enhancement parameter corresponding to the transparency probability to be $p+\Delta p*n$.

4. The method according to claim 1, further comprising:

playing the piece of music after performing the transparency adjustment.

5. The method of claim 1, further comprising:

determining, based on the time domain waveform of the piece of music to be played, frequency points in a frequency domain waveform of the piece of music to be played; and adjusting a parameter of the frequency domain waveform at one of the frequency points.

6. The method of claim 1, wherein the determining the characteristic comprises enhancing the characteristic of the piece of music to be played, wherein the characteristic comprises a transparency effect of the piece of music to be played.

7. The method according to claim 1, wherein before the inputting the characteristic into the transparency probability neural network, the method further comprises:

determining the transparency probability neural network by training, based on a training dataset, a neural network.

8. The method according to claim 7, wherein each training data of the training dataset is music data, and each training data is associated with a characteristic and a transparency probability.

9. The method according to claim 8, wherein the characteristic associated with each training data is determined by:

determining a time domain waveform of the training data, framing the time domain waveform, and extracting characteristic on each frame of the time domain waveform.

10. The method according to claim 8, wherein the transparency probability associated with each training data is determined by:

performing transparency adjustment on the training data to obtain adjusted training data;

obtaining a score from each rater of the set of raters, the score indicating whether a sound quality of the adjusted training data is subjectively superior to the training data; and determining the transparency probability of the training data based on the scores from the set of raters.

11. The method according to claim 10, wherein the determining the transparency probability of the training data based on the scores from the set of raters comprises:

determining an average value of the scores from the set of raters to be the transparency probability of the training data.

12. A method comprising:

determining, by a computing device, based on a time domain waveform of a piece of music to be played, frequency points in a frequency domain waveform of the piece of music to be played;

adjusting a parameter of the frequency domain waveform at one of the frequency points;

obtaining, based on the adjusted parameter, a characteristic of the piece of music to be played;

inputting the characteristic into a transparency probability neural network to obtain a transparency probability of the piece of music to be played;

determining a mapping relationship between the transparency probability and a transparency enhancement parameter by:

performing a plurality of transparency adjustments on a nontransparent piece of music with a transparency probability, wherein transparency enhancement parameters corresponding to the plurality of transparency adjustments are: $p+\Delta p*i$, $i=0,1,2 \ldots$ in order;

determining a plurality of subjective perceptions t(i) corresponding to the transparency adjustments based on scores that are determined by comparing a sound quality of a piece of music adjusted according to the transparency enhancement parameter $p+\Delta p*i$ with a sound quality of a piece of music adjusted according to the transparency enhancement parameter $p+\Delta p*(i-1)$ by a set of raters; and determining the mapping relationship based on a magnitude of t(i);

determining the transparency enhancement parameter based on the mapping relationship between the transparency probability and the transparency enhancement parameter; and performing, based on the transparency enhancement parameter, transparency adjustment on the piece of music to be played.

13. The method according to claim 12, wherein before the inputting the characteristic into the transparency probability neural network, the method further comprises:

obtaining the transparency probability neural network by training, based on a training dataset, a neural network, wherein each training data in the training dataset is music data, and each training data is associated with a characteristic and a transparency probability.

14. An apparatus comprising:

one or more processors; and memory storing instructions that, when executed by the one or more processors, cause the apparatus to:

determine, based on a time domain waveform of a piece of music to be played, a characteristic of the piece of music to be played;

input the characteristic into a transparency probability neural network to obtain a transparency probability of the piece of music to be played;

determine a mapping relationship between the transparency probability and a transparency enhancement parameter by:

performing a plurality of transparency adjustments on a nontransparent piece of music with a transparency probability, wherein transparency enhancement parameters corresponding to the plurality of transparency adjustments are: p+Δp*i, i=0,1,2 . . . in order;

determining a plurality of subjective perceptions t(i) corresponding to the transparency adjustments based on scores that are determined by comparing a sound quality of a piece of music adjusted according to the transparency enhancement parameter p+Δp*i with a sound quality of a piece of music adjusted according to the transparency enhancement parameter p+Δp*(i−1) by a set of raters; and determining the mapping relationship based on a magnitude of t(i);

determine the transparency enhancement parameter corresponding to the transparency probability based on the mapping relationship between the transparency probability and the transparency enhancement parameter; and perform, based on the transparency enhancement parameter, transparency adjustment on the piece of music to be played.

15. An apparatus configured to perform the method of claim 12, the apparatus comprising:

one or more processors; and memory storing instructions that, when executed by the one or more processors, cause the apparatus to perform the method of claim 12.

16. The apparatus of claim 14, wherein the instructions that, when executed by the one or more processors, cause the apparatus to:

determine the transparency probability neural network by training based on a training dataset.

17. The apparatus of claim 16, wherein each training data of the training dataset is music data, and each training data is associated with a characteristic and a transparency probability.

18. The apparatus of claim 17, wherein the instructions that, when executed by the one or more processors, cause the apparatus to:

obtain the characteristic associated with each training data by:

determining a time domain waveform of the training data, framing the time domain waveform, and extracting characteristic on each frame of the time domain waveform.

* * * * *